Patented Sept. 6, 1949

2,481,366

UNITED STATES PATENT OFFICE 2,481,366

GREEN CAMOUFLAGE PAINT

Kenneth V. Thimann, Cambridge, Mass., assignor to the United States of America as represented by the Secretary of the Navy No Drawing. Application August 31, 1943,
Serial No. 500,701

17 Claims. (Cl. 106—132)

This invention relates to a camouflage paint and to a method for preparing the same.

In camouflaging it is often desirable to paint a surface so that it will simulate green vegetation. The ruse is easily detected, where usual green pigments are employed, by photographic methods because the spectrum of the green leaf differs entirely from that of all ordinary green paints, and it can not be duplicated or even closely approached by any one known substance. It is therefore obvious that a camouflage paint in which chlorophyll itself is used as the colorant is highly desirable. However the chlorophyll and carotenoids present in the vegetation are extremely unstable towards light when extracted with acetone or other solvents in the usual way, so that they can not be used for camouflage paints.

This invention provides a method for preparing a colorant comprising chlorophyll which is stable and can be used for coloring paints for camouflaging. It also provides a method of making paints containing this colorant, and the colorant and paints containing the same are also within the purview of the invention.

The method of producing the colorant comprises coprecipitating chlorophyll from vegetation along with the protein naturally associated therewith, in the presence of water, stabilizing the precipitate and partially drying the mixture in the presence of certain oils to yield an aqueous paste. The paint is made by incorporating the paste in a varnish in the form of a water-in-oil type emulsion. The method of precipitating the chlorophyll and protein, stabilization of the chlorophyll, and nature of varnish or binder in which the chlorophyllic colorant is incorporated are highly important for successful results. These operations are described in detail in the following examples in which the materials are given in parts by weight.

Example 1

One part of spinach leaves with two parts of water were ground and mixed in a Waring mill. The time taken for this grinding was about five minutes at top speed. The product from the mill was filtered through a cloth to remove fibrous residue. Then anhydrous sodium carbonate dissolved in a minimum of water was added in the proportion of five grams of the anhydrous carbonate per liter of filtrate. After addition of the sodium carbonate, a solution of 20% zinc sulfate ($ZnSO_4 \cdot 7H_2O$) in an amount of 111 ml. per liter of the mixture was stirred in. This gave a final zinc sulfate concentration of about 2%, and the chlorophyll, protein and part of the zinc (as carbonate) were precipitated after the mixture was allowed to stand a few minutes. The mixture was then centrifuged until complete separation was obtained and the precipitate was washed twice with water in the centrifuge.

To the washed precipitate, which still contained a considerable amount of water, there was added 15 grams of sucrose and 5 grams of magnesium sulfate per 100 grams of precipitate, and the paste was stirred until the sugar and magnesium sulfate were dissolved. Then 20 grams of dehydrated castor oil were added per 100 grams of the washed precipitate and stirred thoroughly. After that the material was set out on glass plates and allowed to dry over night in an air stream, the water loss being approximately 50%.

The partially dried paste was then mixed with an equal weight of a medium pale cooked varnish composed of window-glass rosin modified with bodied linseed oil and castor oil (a 22½ gal. long varnish). The mixture of partially dried paste (i. e. the colorant) and varnish was milled on a small roller mill with the rollers set for mixing at one pass and then for fine grinding at a second pass.

The varnish prepared as described weathered 200 hours in a standard weatherometer with little visible change, and it kept three weeks in a bottle with no change.

Example 2

The procedure described in Example 1 was repeated up through the operation of adding the sucrose and magnesium sulfate. At this point 10 grams of fish glue per 100 grams of washed precipitate were added. The composition was well mixed and then 30 grams of a dehydrated castor oil (Synthenol-Z-1) per 100 grams of washed paste were added. The resulting mixture was set out to dry as in Example 1 and then it was incorporated with equal parts of a varnish consisting of four parts of a pale copal resin and 7 parts of Synthenol-Z-1 cooked together.

After the addition the varnish was cooked for an hour at about 300° C., cooled and diluted with half its weight of xylol. Driers were added to a final concentration in the oil of 2% lead and 0.07% cobalt, in the form of naphthenates.

This mixture was then milled in a small roller mill, one pass, with the rollers set for mixing. Then four grams of a silica aerogel per 100 grams of the ground mix were added with stirring. The resulting product was diluted with a small quantity of xylol to brushing consistency.

The success of the method of this invention in preparing practicable chlorophyllic paints lies in the way the chlorophyll is stabilized against breakdown both by light and weather, and by the proper selection of paint ingredients. Thus, the chlorophyll must be precipitated, or recovered from the plant, in association with the protein present. In the examples this was accomplished by the use of zinc sulfate, although other salts, such as magnesium, copper and manganese may be used. Certain salts, such as those of iron and tin, are not very desirable because the precipitates are off color and are difficult to stabilize with the sugar and magnesium sulfate. The presence of a mold base with the chlorophyll was found to inhibit browning, and that was accomplished in the examples by the use of sodium carbonate which precipitated zinc carbonate along with the chlorophyll and protein. Any soluble carbonate can be used in place of the sodium carbonate.

It is not desirable to remove all of the water from the precipitate, for best stability, although a large excess should also be avoided, and the partial drying described gave very stable compositions. To avoid drying the material to an unworkable gum, oil was added before drying. Especially suitable oils are dehydrated castor oil, raw linseed oil and blown soya bean oil. A surprising fact is that chlorophyll is not affected by drying oils with which it is dried, but is affected adversely by such oils in varnishes, after it has been dried and emulsified therein.

Since chlorophyll is sensitive to untreated drying oils and phenolic resins in the varnish these materials can not be used for the varnish in which the aqueous chlorophyll paste is emulsified. "Untreated drying oils" are those in the natural raw condition. Treated oils are those which have been subjected to one or more operations to improve their drying properties such as blowing, heat-bodying, air-bodying, vacuum-bodying, alkali-refining, acid-refining, gelation, dehydration, etc. The oil modified rosin type of varnish, particularly pale copal resin varnishes, have been found to be satisfactory. However many types of commercial pale varnishes of the oil modified rosin or ester gum type are suitable vehicles for the chlorophyll paste.

The stable chlorophyll paints made with varnishes are very glossy. Ordinary flatting agents such as calcium carbonate and calcium sulfate must be used in such high quantities to obtain the requisite flatting that considerable chalkiness and more rapid bleaching results. However, an excellent type of flatting agent are the various colloidal silicas, particularly silica aerogel. This type of flatting agent has a good effect at as little as 5% concentration and does not promote bleaching. The flatting agent should be fairly coarse and should preferably have been precipitated from a solution of minimum acidity, as carry over of the acidity to the chlorophyll causes undesirable reactions and loss of color.

The green vegetable matter from which the chlorophyll is obtained is not very important, although different materials yield chlorophyll extracts of different shades. Generally, the very fibrous materials are difficult to handle. Spinach was chosen in the examples because it was easily available, is easily ground and provides a dark green color of greater concentration than most vegetation.

The paints described herein do not have great hiding power so that they should be applied over a white or light colored undercoat which is infra-red bright. The paints will also show fairly rapid bleaching if applied in too thin a coat, and they should therefore be made with a high body so that when brushed the proper film thickness is obtained. Ordinary naphthenate dryers can be used, but the paints require at least 24 hours to dry.

The presence of glue in the colorant is not necessary, but in small concentrations it is an aid to retardation of bleaching in the green portion of the spectrum, and consequent increase in absorption in the infra-red.

The mixes made by adding sodium carbonate to the aqueous chlorophyll solution and precipitating chlorophyll-protein and zinc carbonate keep excellently in bottles. This applies also to the mixes made with cooked varnishes. In the absence of zinc carbonate, however, the pigment will keep its color in a mix if a small amount of sodium carbonate is added along with the stabilizers, such as about 0.7 gram anhydrous sodium carbonate per 100 grams of stabilized paste, added before drying. Such pastes are darker in color than the coprecipitate containing zinc carbonate. They are not lightened by thinning, but they may be lightened by the addition of not over about 10% of barytes (or other white pigment) and a corresponding increase in the amount of varnish.

The term "colorant," as used herein, refers to the coloring matter used in a paint regardless of whether it is in pigment form or is dissolved in the vehicle. In particular it refers to the chlorophyll-containing composition prior to its incorporation in a vehicle.

Many variations will be apparent to those skilled in the art, and the invention should not be limited other than as defined by the appended claims.

I claim:

1. Method of preparing a paint colorant which comprises grinding chlorophyllic vegetable matter in the presence of water, precipitating chlorophyll in combination with protein by means of a compound selected from the group consisting of sulfates of zinc, magnesium, copper and manganese, stabilizing the chlorophyll by addition of sugar and magnesium sulfate, and partially drying the mixture.

2. The method as claimed in claim 1 wherein said drying is conducted in the presence of a drying oil.

3. Method of preparing a paint colorant which comprises grinding chlorophyllic vegetable matter in the presence of water, precipitating chlorophyll in combination with protein by means of zinc sulfate in the presence of a soluble carbonate, washing the precipitate, stabilizing the chlorophyll by addition of sucrose and magnesium sulfate, and partially drying the mixture.

4. Method as claimed in claim 3 wherein said drying is conducted in the presence of dehydrated castor oil.

5. Method as claimed in claim 3 wherein said drying is conducted in the presence of dehydrated castor oil and glue.

6. Method of preparing a paint which comprises grinding chlorophyllic vegetable matter in the presence of water, precipitating chlorophyll in combination with its associated protein by addition of a metal sulfate selected from the group consisting of zinc, magnesium, copper and manganese sulfates, stabilizing the chlorophyll by the addition of sugar and magnesium sulfate, partially drying the mixture, and emulsifying said mixture with a varnish comprising a treated natural drying oil and an oil modified natural resin.

7. Method as claimed in claim 6 wherein said varnish is based upon a linsed modified copal resin.

8. Method as claimed in claim 6 wherein said drying is conducted in the presence of a drying oil, and in which said varnish is based upon a linseed modified rosin.

9. Method of preparing a paint which comprises grinding chlorophyllic vegetable matter in the presence of water, precipitating chlorophyll in combination with protein by means of a metal sulfate selected from the group consisting of zinc, magnesium, copper and manganese, stabilizing the chlorophyll by addition of sugar and magnesium sulfate, partially drying the mixture in the presence of a drying oil, and emulsifying the mixture in a varnish comprising a treated natural drying oil and a light colored oil modified rosin.

10. Method as claimed in claim 9 wherein said metal sulfate is zinc sulfate, said sugar is sucrose, and said rosin varnish is based upon a linseed oil modified rosin, and said mixture is dried in the presence of glue, along with the oil.

11. A paint colorant which comprises a mixture of the product obtained by coprecipitation of chlorophyll and its associated protein by addition, in the presence of water, of a sulfate of a metal selected from the group consisting of zinc, magnesium, copper and manganese, and a stabilizer for said chlorophyll comprising sugar and magnesium sulfate.

12. A paint colorant which comprises a mixture of the type defined in claim 11 wherein the selected metal is zinc.

13. A paint colorant which comprises a mixture of: the product obtained by coprecipitation of chlorophyll and its associated protein by addition, in the presence of water, of a sulfate of a metal selected from the group consisting of zinc, magnesium, copper and manganese, a stabilizer for said chlorophyll comprising sugar and magnesium sulfate, and a drying oil.

14. A paint comprising a water-in-oil type emulsion of a colorant and a varnish; said colorant comprising a mixture of the product obtained by coprecipitation of chlorophyll and its associated protein by addition, in the presence of water, of a sulfate of a metal selected from the group consisting of zinc, magnesium, copper and manganese, a stabilizer for said chlorophyll comprising sugar and magnesium sulfate, and a drying oil; and said varnish comprising a treated natural drying oil, and an oil modified natural resin.

15. A paint as defined in claim 14 wherein said selected metal is zinc.

16. A paint as defined in claim 14 wherein said metal is zinc, said treated drying oil is bodied linseed oil and said natural resin is rosin.

17. A paint as defined in claim 14 wherein said metal is zinc, said treated drying oil is dehydrated castor oil and said natural resin is copal.

KENNETH V. THIMANN.

REFERENCES CITED

The following references are of record in the file of this patent:

UNITED STATES PATENTS

| Number | Name | Date |
|---|---|---|
| 1,953,607 | Holmes | Apr. 3, 1934 |
| 2,098,110 | Schertz | Nov. 2, 1937 |
| 2,131,394 | Trest | Sept. 27, 1938 |

OTHER REFERENCES

Industrial and Engineering Chemistry, vol. 33, No. 11, pages 1428 to 1432.